(12) United States Patent
Marti et al.

(10) Patent No.: US 9,002,373 B2
(45) Date of Patent: *Apr. 7, 2015

(54) MONITORING A LOCATION FINGERPRINT DATABASE

(71) Applicant: Apple Inc., Cupertino, CA (US)

(72) Inventors: Lukas M. Marti, Santa Clara, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/715,627

(22) Filed: Dec. 14, 2012

(65) Prior Publication Data

US 2014/0171100 A1    Jun. 19, 2014

(51) Int. Cl.
  *H04W 64/00* (2009.01)
  *H04W 24/00* (2009.01)
  *G01S 5/02* (2010.01)

(52) U.S. Cl.
  CPC ............. *H04W 24/00* (2013.01); *G01S 5/0242* (2013.01); *G01S 5/0252* (2013.01); *H04W 64/003* (2013.01)

(58) Field of Classification Search
  CPC ......... G01S 5/14; H04W 4/023; H04W 64/00
  USPC ............. 455/404.2, 456.1, 456.6, 457, 556.2, 455/421, 420, 435.2; 370/328, 338, 331, 370/332

See application file for complete search history.

(56) References Cited

U.S. PATENT DOCUMENTS

| 8,200,247 | B1 | 6/2012 | Starenky et al. |
| 2008/0004037 | A1 | 1/2008 | Achlioptas et al. |
| 2009/0310585 | A1* | 12/2009 | Alizadeh-Shabdiz ........ 370/338 |
| 2011/0208425 | A1 | 8/2011 | Zheng et al. |
| 2012/0220314 | A1 | 8/2012 | Altman et al. |
| 2013/0143597 | A1* | 6/2013 | Mitsuya et al. ............ 455/456.1 |

FOREIGN PATENT DOCUMENTS

| CA | 2 628 121 | 10/2009 |
| WO | 2007/056738 | 5/2007 |
| WO | WO 2007056738 A2 * | 5/2007 |

OTHER PUBLICATIONS

International Search Report and Written Opinion of the International Searching Authority, PCT Application Serial No. PCT/US2013/071742, Mar. 11, 2014, 12 pp.

* cited by examiner

*Primary Examiner* — Babar Sarwar
(74) *Attorney, Agent, or Firm* — Fish & Richardson P.C.

(57) ABSTRACT

Methods, program products, and systems for monitoring a location fingerprint database are described. A location fingerprint database can store location data associated with multiple signal sources. A mobile device can use signals of the signal sources and the location data to determine a current location. A location server can monitor the location fingerprint database, including detecting if any one of the signal sources has moved or otherwise becomes unsuitable for location determination. The location server can prevent location data associated with the unsuitable signal source from being used by the mobile device to determine the current location of the mobile device

21 Claims, 9 Drawing Sheets

MONITORING A LOCATION FINGERPRINT DATABASE

TECHNICAL FIELD

This disclosure relates generally to location determination.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places, GPS signals can be non-existent, weak, or subject to interference, such that it is not possible to accurately determine a location using the GPS functions of the mobile device. In such cases, a mobile device can determine its location using other technology. For example, if the location of a wireless access gateway (e.g., a cellular tower) is known, and a mobile device can detect the wireless access gateway, the mobile device can estimate a current location using a location of the detected wireless access gateway. The location of wireless access gateways can be stored in a location database on the mobile device or on a server.

SUMMARY

Methods, program products, and systems for monitoring a location fingerprint database are described. A location fingerprint database can store location data associated with multiple signal sources. A mobile device can use signals of the signal sources and the location data to determine a current location. A location server can monitor the location fingerprint database, including detecting if any one of the signal sources has moved or otherwise becomes unsuitable for location determination. The location server can prevent location data associated with the unsuitable signal source from being used by the mobile device to determine the current location of the mobile device.

In general, in one aspect, monitoring a location fingerprint database can include the following operations performed by a location server. The location server can receive, from a mobile device, an identifier of a signal source and a device location. The device location can be a location where the mobile device detected a signal from the signal source. The device location can be determined by the mobile device independently of the signal source. The location server can determine that the identifier of the signal source is stored in a location fingerprint database and is stored in association with a signal source location. The signal source and the signal source location can be used by a mobile device that does not receive a GPS signal to estimate a location of the mobile device. The location server can determine, based on the received device location, a calculated location of the signal source. The location server can determine that a distance between the calculated location of the signal source and the signal source location as stored in the location fingerprint database exceeds a reliability threshold. The location server can then modify the location fingerprint database, including, for example, removing the signal source from being used to estimate the location of the user.

Monitoring a location fingerprint database can achieve the following advantages. Data integrity of the location fingerprint database can be upheld. The location fingerprint database can include location data for signal sources. A mobile device that cannot receive a GPS signal (e.g., one located inside of a building) may depend on the location data received from a location server to determine where in the building the mobile device is located. When the mobile device detects a signal from a given signal source (e.g., a hotspot of a wireless network), the mobile device can determine a location using a location of the signal source. The location of the signal source can change. For example, a personal mobile hotspot (e.g., a MiFi™ device) can move to an office during the day and to a home at night. If the location of the office is associated with the personal mobile hotspot in the location fingerprint database, a mobile device detecting the personal mobile hotspot at night may erroneously determine that a current location of the mobile device is in the office. Through location fingerprint database monitoring, movement of the personal mobile hotspot can be detected. The personal mobile hotspot can be removed from the location fingerprint database or otherwise prevented from being used to calculate the location of the mobile device. Accordingly, the erroneous location determination can be avoided.

The details of one or more implementations of monitoring a location fingerprint database are set forth in the accompanying drawings and the description below. Other features, aspects, and advantages of location data regression will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
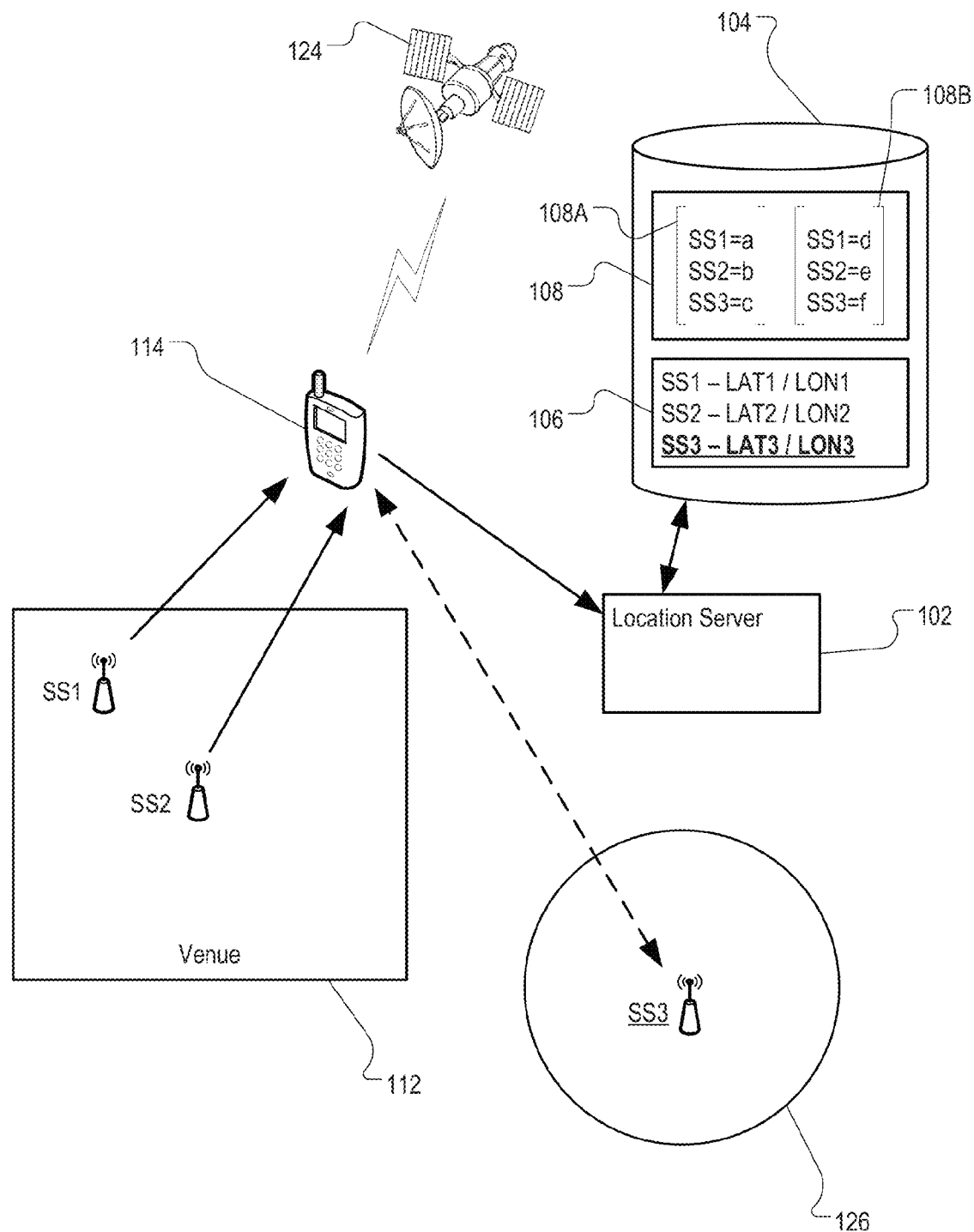
FIG. 1 is a block diagram providing an overview of monitoring a location fingerprint database.

FIG. 1 is a block diagram providing an overview of monitoring a location fingerprint database. Exemplary location server 102 can perform the monitoring. Location server 102 can include one or more computers programmed to monitor location fingerprint database 104. Location server 102 can monitor location fingerprint database 104 by updating location fingerprint database 104 when location server 102 identifies inconsistency between location data stored in location fingerprint database 104 and monitor data received from one or more mobile devices.

Location fingerprint database 104 can store multiple data sets. Each data set can be associated with a venue (e.g., an office building), and be used by a mobile device to determine a location of the mobile device at the venue. In the example shown, location fingerprint database 104 can include signal source information 106 and measurement data 108. Signal source information 106 and measurement data 108 can be location data associated with venue 112.

Signal source information 106 can include location coordinates and other attributes (e.g., type, model, or power) of each of multiple signal sources. Measurement data 108 can include, for example, expected measurements of the signal sources and associated uncertainty at multiple sample locations in venue 112. Additional details of location fingerprint database 104 will be described below in reference to FIG. 2.

Location server 102 can provide signal source information 106 and measurement data 108 to a mobile device upon request. A mobile device, when located at or near venue 112, can request location fingerprint data from location server 102 that correspond to venue 112. When the mobile device receives the location fingerprint data, the mobile device can determine a high-granularity location of the mobile device or a pedestrian carrying the device at the venue. The location can be an indoor location. The indoor location can include, for example, on which floor, in which hallway, or in which office of an office building the mobile device or pedestrian is located.

Venue 112 can include one or more constraints limiting the pedestrian's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian cannot move faster than X miles per hour, or move vertically when not in a stairway or elevator). Venue 112 can be a physical structure. The physical structure can be closed (e.g., a high-rise building) or open (e.g., an open stadium). The space can be indoor space inside of the physical structure, or space inside of a bounding space of the physical structure if the physical structure is open. For example, venue 112 can be a multi-story office building having a lobby, offices, walls, doors, elevators, and hallways. Venue 112 can be mobile (e.g., an airplane, a cruise ship, or a mobile oil platform). A pedestrian can be a human or a device that moves at a speed that is similar to a human's walking or running speed.

In the example shown, location server 102 can determine, based on past survey data, that signal sources SS1, SS2, and SS3 are expected to be detectable at venue 112, and are usable by a mobile device located at venue 112 to determine the location of the device. Signal source information 106 can include latitudes, longitudes, and optionally, altitudes of signal sources SS1, SS2, and SS3. Measurement data 108 can include measurement vector 108A and measurement vector 108B. Measurement vectors 108A and 108B can include expected measurements (e.g., expected received signal strength indication (RSSI) or a signal round trip time) of signal sources SS1, SS2, and SS3 at a first location inside of venue 112 and a second location inside of venue 112, respectively.

Location server 102 can receive monitor data from mobile device 114. Mobile device 114 can be a mobile device that is located at or near venue 112 and that is configured to determine a location using a procedure that is independent from measurements from signal sources SS1, SS2, or SS3. For example, mobile device 114 can determine a location using GPS signals from satellites 124, when mobile device 114 is located near and outside of venue 112. The monitor data can include the independently determined location of mobile device 114.

The monitor data received by location server 102 from mobile device 114 can include the independently determined location and measurements by mobile device 114 of signals from signal sources detected by mobile device 114. In some implementations, the measurements can include a list of identifiers of signal sources (e.g., SS1 and SS2) detected by mobile device 114 at the independently determined location. The list of identifiers can include a media access control (MAC) address or unique name or label of each of the detected signal sources.

Location server 102 can determine, based on the independently determined location of mobile device 114 and the list of identifiers, that mobile device 114 is located sufficiently close to each of the signal sources identified in the list. For example, location server 102 can determine that the independently determined location is within a communication range from the locations of signal sources SS1 and SS2 as stored in location fingerprint database 104. Accordingly, location server 102 can determine that the portion of data of signal sources SS1 and SS2 in signal source information 106 is consistent with the received monitor data.

Location server 102 can receive, from a mobile device X, monitor data that includes an independently determined location of mobile device X and an identifier of signal source SS3. Mobile device X can be mobile device 114 or another mobile device. Location server 102 can determine, based on location coordinates in signal source information 106 of signal source SS3 and the independently determined location of mobile device X, that a distance between the independently determined location of mobile device X and the location of signal source SS3 as stored in location fingerprint database 104 exceeds reach 126 of signal source SS3. Reach 126 can correspond to an estimated maximum communication range. Accordingly, location server 102 can determine that the portion of data of signal source SS3 in signal source information 106 is inconsistent with the received monitor data. Accordingly, location server 102 can determine that signal source SS3 has moved since last survey, and is no longer suitable for determining a location of a mobile device at venue 112.

Upon determining the inconsistency, location server 102 can modify the location fingerprint database 104. Modifying the location fingerprint database 104 can include, for example, removing references of signal source SS3 from location fingerprint database 104, preventing information associated with signal source SS3 from being sent to mobile devices for determining locations, or reducing a weight of signal source SS3 in calculating locations.

In some implementations, location server 102 can modify the location fingerprint database 104 after location server 102 has received sufficient corroboration of the monitor data received from mobile device X. For example, location server 102 can modify the location fingerprint database 104 when location server 102 has received more than a threshold amount of monitor data from more than a threshold number of mobile device such that location server 102 can determine an estimated location of signal source SS3 with a sufficient certainty. Location server 102 can modify the location fingerprint database 104 when the estimated location is inconsistent with the stored location of Location server 102 can execute a procedure to identify inconsistencies between location data stored in location fingerprint database 104 and monitor data received from mobile device 114 periodically. Additionally or alternatively, location server 102 can execute the procedure to identify the inconsistencies based on a trigger event, e.g., when location server 102 receives monitor data from mobile device 114. The monitor data can be submitted by mobile device 114 either in a crowd source mode or in a designated mode. In crowd source mode, mobile device 114 can be a random mobile device whose user explicitly permits submission of monitor data. The monitor data are anonymized by mobile device 114, where any information identifying mobile device 114 is removed. In designated mode, mobile device 114 is a mobile device configured to perform location fingerprint database monitoring tasks, including transmitting the monitor data to location server 102. The mobile device can be designated to an appointed surveyor.

Exemplary Location Fingerprint Data

Figure 2:
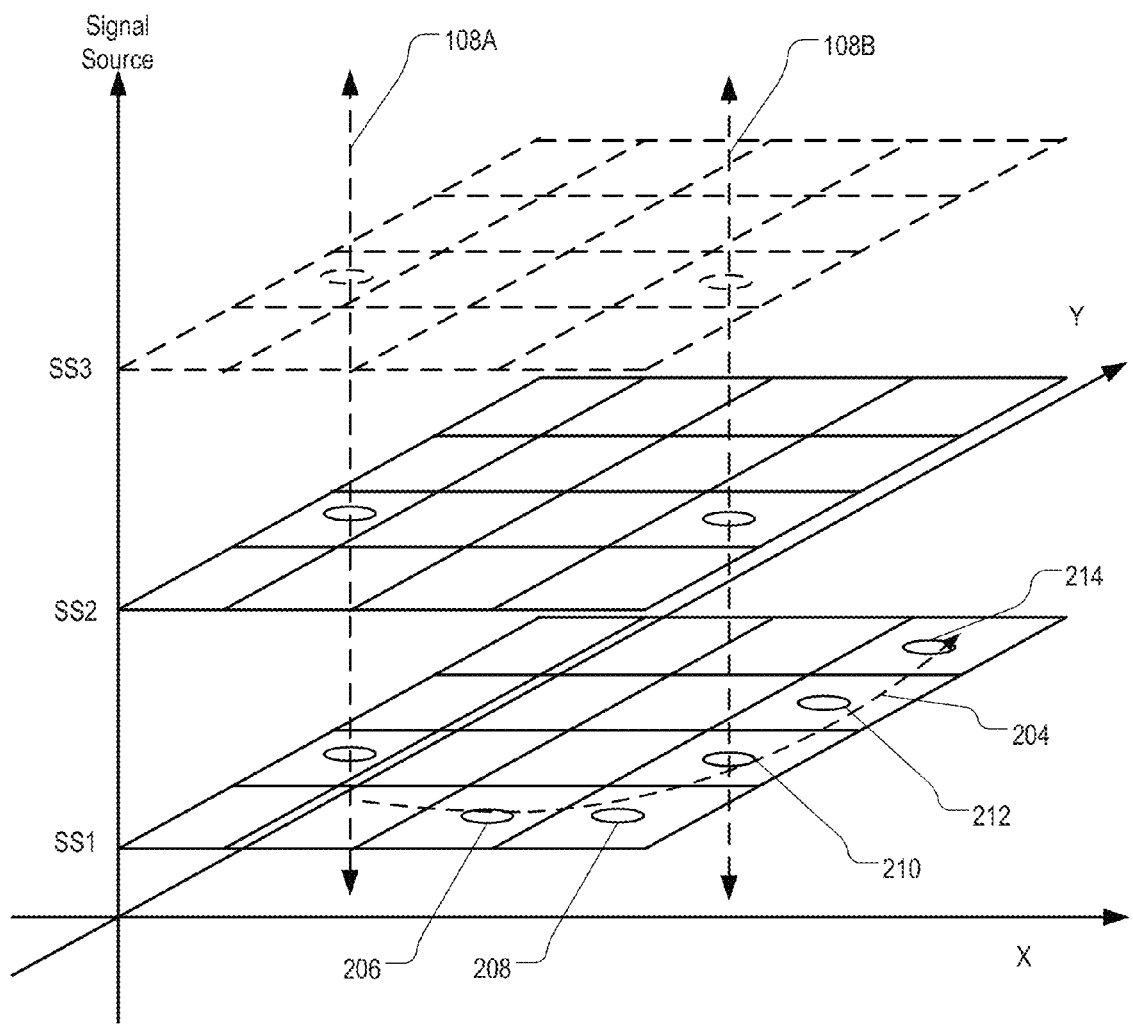
FIG. 2 illustrates an exemplary logical structure of a location fingerprint database.

FIG. 2 illustrates an exemplary logical structure of location fingerprint data. The location fingerprint data can be stored in location fingerprint database 104 of FIG. 1, and monitored by location server 102 of FIG. 1. The exemplary logical structure illustrated in FIG. 2 can correspond to a portion of the location fingerprint database, e.g., measurement data 108 as described in reference to FIG. 1.

Location fingerprint data can include, for each location among multiple locations in a venue (e.g., venue 112 of FIG. 1), expected measurements of the signal sources, variance of the expected measurements, and weights of the expected measurements.

The expected measurements can correspond to more than one type of signal sources. For example, location fingerprint data can include at least one of: wireless access point fingerprint data; radio frequency identification (RFID) fingerprint data; near field communication (NFC) fingerprint data; Bluetooth™ fingerprint data; magnetic field fingerprint data; cellular fingerprint data; or computer vision fingerprint data. The various fingerprint data can be aggregated to form the location fingerprint data for a given venue or a given location at the venue.

Location fingerprint data can be stored as multi-dimensional data in association with a venue. Some of the dimensions of the multi-dimensional data can be space dimensions. The space dimensions can include X (e.g., latitude), Y (e.g., longitude), and Z (e.g., altitude, not shown). The space dimension can be continuous, expressed in a function, or discrete, where the space dimension can include locations (e.g., locations 206, 208 210, 212, and 214) distributed in the venue. The distribution can be even and uniform, or concentrated around areas where good measurements (e.g., strong signals or strong contrast between a first signal and a second signal) exist.

At least one dimension of the multi-dimensional data can be a signal source dimension. Location fingerprint data can include multiple measurement vectors, each measurement vector corresponding to a location in the venue. Measurement vector 108A can correspond to a location represented by (X1, Y1, Z1), and have one or more values of each signal source at location (X1, Y1, Z1). Likewise, measurement vector 108B can correspond to a location represented by (X2, Y2, Z2), and have one or more values of each signal source at location (X2, Y2, Z2). The values can include one or more of an expected value of an environment variable (e.g., an expected RSSI), a variance of the expected value, or weight that corresponds to a probability that a mobile device can detect the signal from the signal source. Location server 102 can determine the expected measurement and variance based on measurements and variance of the measurements received from a sampling device. The sampling device can be a mobile device configured to detect signals from signal sources at multiple locations in the venue when the mobile device moves in the venue.

In some implementations, the space dimension can be normalized. Each measurement received from a sampling device can correspond to a sampling point. For example, a surveyor can carry the sampling device and follow path 204 to survey a venue. Location server 102 can determine a location grid, and normalize path 204 to locations 206, 208 210, 212, and 214 according to distribution of 206, 208 210, 212, and 214. More details on obtaining measurement using survey by sampling device will be described below in reference to FIG. 3.

Location server 102 can monitor the location fingerprint database, including determining which signal source has moved such that a location determination using that signal source will become unreliable. For example, when location server 102 determines signal source SS3 has moved more than a threshold distance, location server 102 can reduce the signal source dimension by removing signal source SS3 from the location fingerprint database, or otherwise excluding signal source SS3 from being used for location determination. In the example shown, information related to removed or excluded signal source SS3 is marked in dashed lines.

Figure 3:
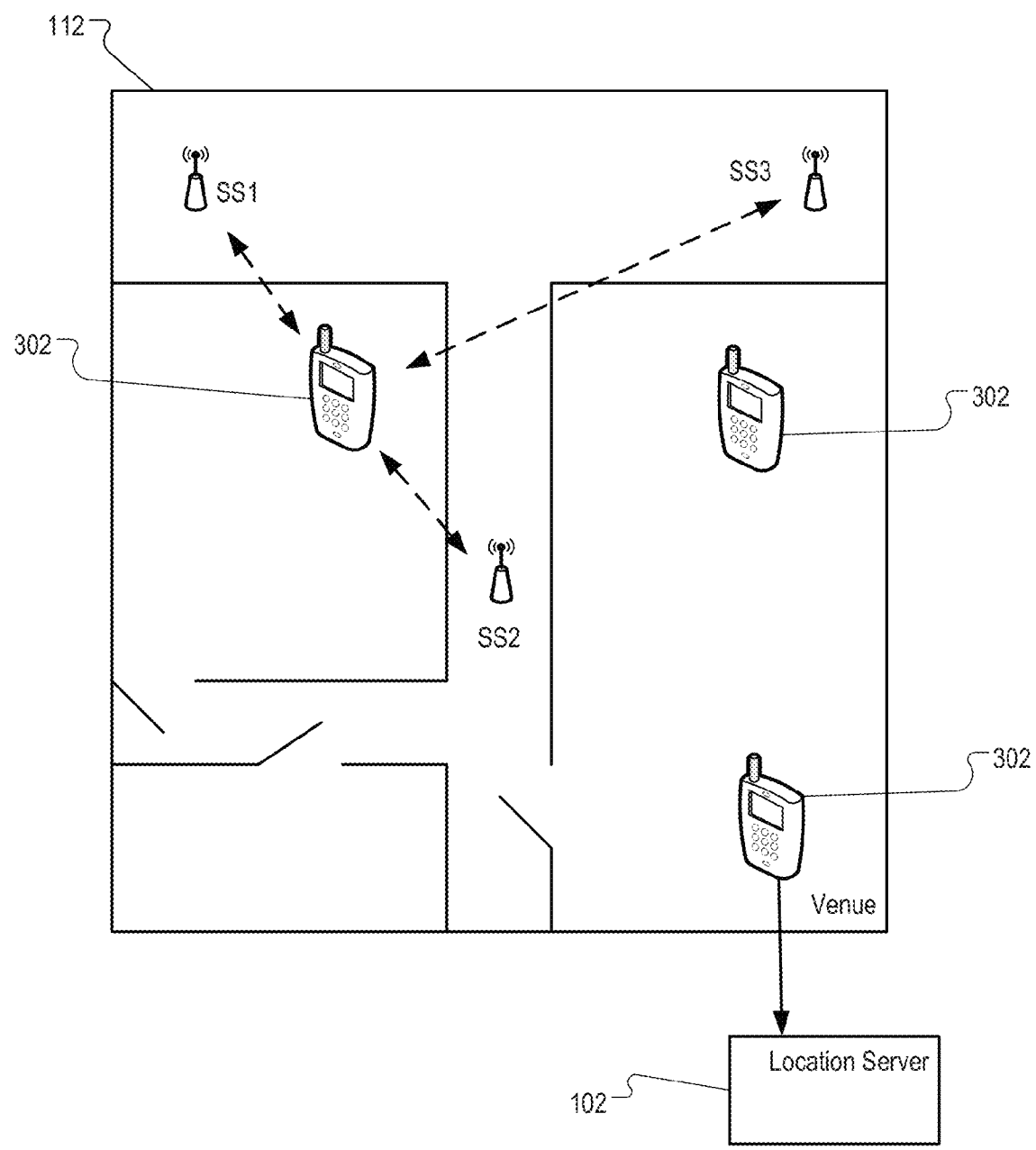
FIG. 3 illustrates exemplary survey techniques for generating location fingerprint data.

FIG. 3 illustrates exemplary survey techniques for generating location fingerprint data of FIG. 2. In a survey, sampling device 302 can measure signals from one or more signal sources and submit the measurements to location server 102 for processing.

Surveying venue 112 can include measuring one or more environment variables using a sensor of sampling device 302. Each environment variable can correspond to a signal from a signal source. Each environment variable can be natural or artificial. For example, an environment variable can be a radio signal, a magnetic field intensity or direction, a temperature, a sound level, a light intensity or color, or air pressure. The environment variables can include signals from signal sources SS1, SS2, and SS3. Signal sources SS1, SS2, and SS3 can transmit signals that are detectable by sampling device 302 at venue 112. Physically, signal sources SS1, SS2, and SS3 may be located inside or outside of venue 112.

Sampling device 302 can be carried by a surveyor to various sampling points in venue 112. The surveyor can be a person or a device that can physically move to various locations inside of venue 112. Sampling device 302 can determine the sampling points based on a user input on a map of venue 112 displayed on sampling device 302. At each sampling point, sampling device 302 can record a sensor reading measuring signals from one or more signal sources. For example, if signal sources SS1, SS2, and SS3 are wireless access points, sampling device 302 can record sampled information from signal sources SS1, SS2, and SS3 when sampling device 302 can detect a signal from that wireless access point (as indicated in dashed lines in FIG. 3). The sampled information can include a service set identification (SSID) or MAC address received from each of the wireless access points, and RSSI from each wireless access point. Sampling device 302 can designate the sampled information at each sampling point measurements of the sampling point. At each sampling point, sampling device 302 need not detect signals from all signal sources to generate the measurements for a sampling point. Sampling device 302 can send the measurements to location server 102 as survey data for additional processing.

Location server 102 can generate measurement vectors that include expected measurements based on the measurements in the survey data received from sampling device 302. In some implementations, location server 102 can determine expected measurements, including measurement vectors 108A and 108B of FIG. 2, using interpolation from the measurements in the survey data. In some implementations, location server 102 can determine some or all measurement vectors, including measurement vectors 108A and 108B, using prediction. Predication can include extrapolation using truth data on signal sources. The truth data can include known locations of the signal sources at venue 112.

Location server 102 can obtain the variance of the expect measurements based on difference in the measurements in the survey data. Location server 102 can determine feature vectors that include weights of each signal source at multiple locations. Location server 102 can determine the feature vectors based on, for example, strength of a signal from each signal source as surveyed at each location at the venue, where a stronger signal is associated with a higher weight.

In the example shown, at survey time, signal source SS3 is located inside venue 112 and is detectable in venue 112. Accordingly, location fingerprint data stored in a location fingerprint database and associated with venue 112 can include data on signal source SS3. Signal source SS3, as well as other signal sources, may move away from venue 112. The movement can be detected after the survey is completed. In some implementations, when location server 102 determines that a sufficient number of signal sources (e.g., a threshold number of signal sources or a threshold percentage of signal sources) have moved away from venue 112, location server 102 can request a new survey be performed at venue 112. The request can be sent to a location system administrator or a surveyor. Upon receiving the request, the location system administrator or surveyor can designate a mobile device as a sampling device for venue 112 to conduct the new survey. In some implementations, the request can be sent to one or more mobile devices that, upon receiving the request, automatically become sampling devices for surveying venue 112.

Reach of a Signal Source

Figure 4:
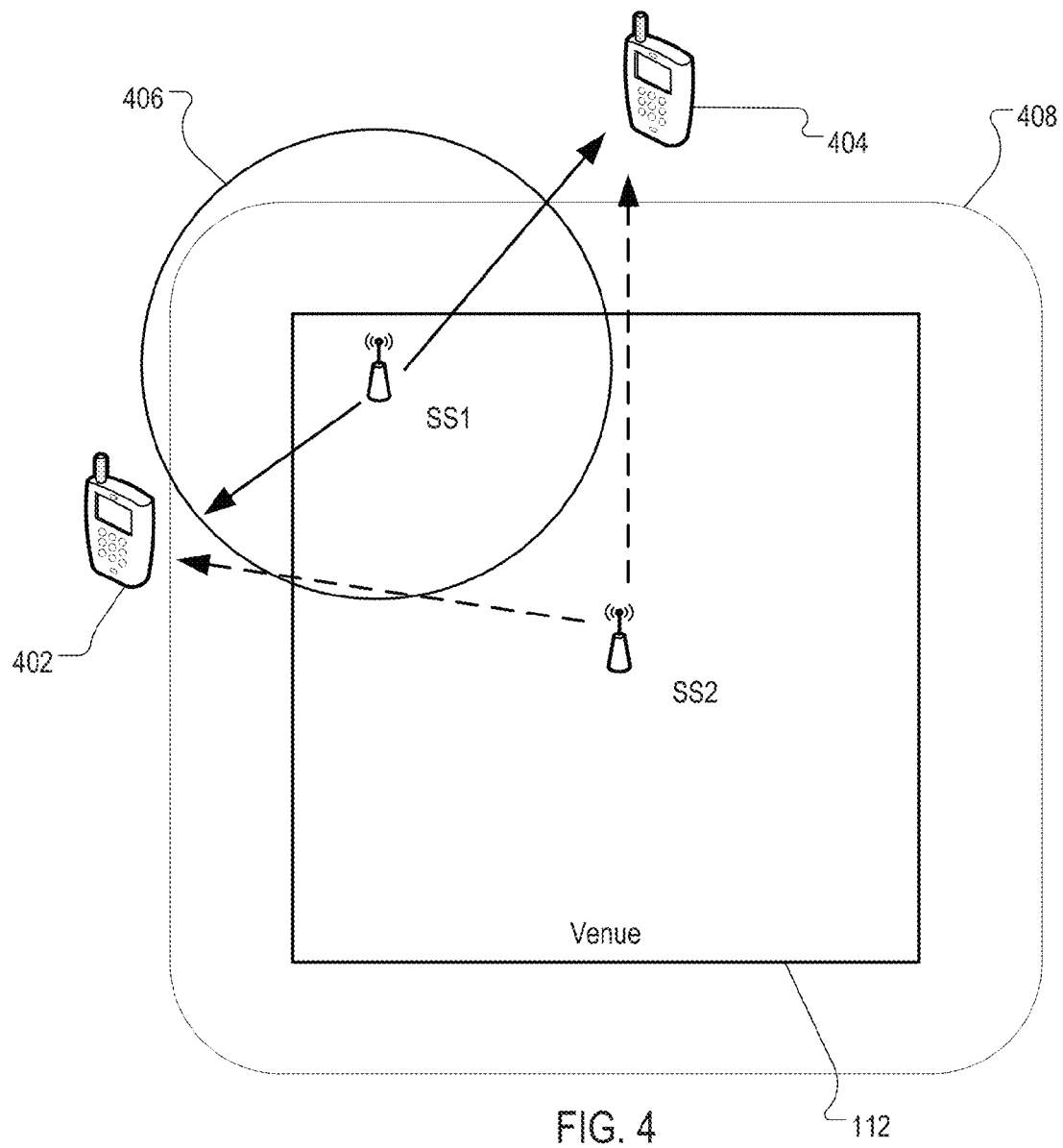
FIG. 4 illustrates exemplary techniques for determining a reach of a signal source.

FIG. 4 illustrates exemplary techniques for determining a reach of a signal source. The reach of a signal source can be a detected or estimated communication range within which a signal from the signal source can be detected. The reach can be used as a threshold in location fingerprint database monitoring, where if a location server determines that the signal source moved a distance longer than the reach, the location server can label the signal source as moved, or remove the signal source from the location fingerprint database.

In the example shown, venue 112 can be a building having walls or other barriers that can attenuate signals from signal sources SS1 and SS2. Signal source SS1 is located sufficiently close to the edge of venue 112 such that mobile devices 402 and 404, which are located outside of venue 112, can clearly detect a signal from signal source SS1. A location server (e.g., location server 102 of FIG. 1) can receive, from mobile devices 402 and 404, monitor data that include respective locations of mobile devices 402 and 404 and measurements of the signal from signal source SS1. Based on the received monitor data, the location server can determine a location of signal source SS1 using an estimation based on a probability density function. The location can be a most likely location of signal source SS1. The measurement of signals (e.g., RSSI) can be strong (e.g., +20 dB). Accordingly, the location server can determine the location of signal source SS1 with high precision (e.g., within a few meters) and high certainty (e.g., more than 85 percent).

Based on the location of signal source SS1 and a type or power of signal source SS1, the location server can determine covered area 406 of signal source SS1, where if a mobile device detects a signal of signal source SS1 from outside of covered area 406, the location server can determine that signal source SS1 has moved. Covered area 406 can be determined by a location of signal source SS1 and a reach of signal source SS1. For example, covered area 406 can be a circle or sphere having the location of signal source SS1 as a center and the reach of signal source SS1 as a radius. Covered area 406 is shown as a circle smaller than venue 112 in FIG. 4. In various implementations, covered area 406 can have other geometric shapes, e.g., a sphere, when altitude is used, and can be either smaller or larger than venue 112 (e.g., having a radius of 10 or 500 meters).

In the example shown, signal source SS2 is located close to the center of venue 112. Signals from signal source SS2 that are detectable by mobile devices 402 and 404 located outside of venue 112 can be weak (e.g., less than −95 dB), intermittent, or non-existent. A location server can still determine an estimated location of signal source SS2. For example, if mobile devices 402 and 404 cannot detect the signal from signal source SS2, the location server can determine that signal source SS2 is inside venue 112 based on survey techniques as described above in reference to FIG. 3. However, the location server can determine that the estimated location of signal source SS2 is large, and the associated uncertainty is high.

When the estimated location of signal source SS2 is large, and the associated uncertainty is high, the location server can determine that signal source SS2 has covered area 408. The location server can determine covered area 408 based on a shape of venue 112 and a reach of signal source SS2. For example, the location server can determine that covered area 408 is in the shape of venue 112 extended by the reach of the signal source SS2 (e.g., X meters, based on an expected communication range of signal source SS2) times a multiplier (e.g., 1× or 2×). If a mobile device detects a signal of signal source SS2 from outside of covered area 408, the location server can determine that signal source SS2 has moved, and update a location fingerprint database accordingly.

Exemplary System Components

Figure 5:
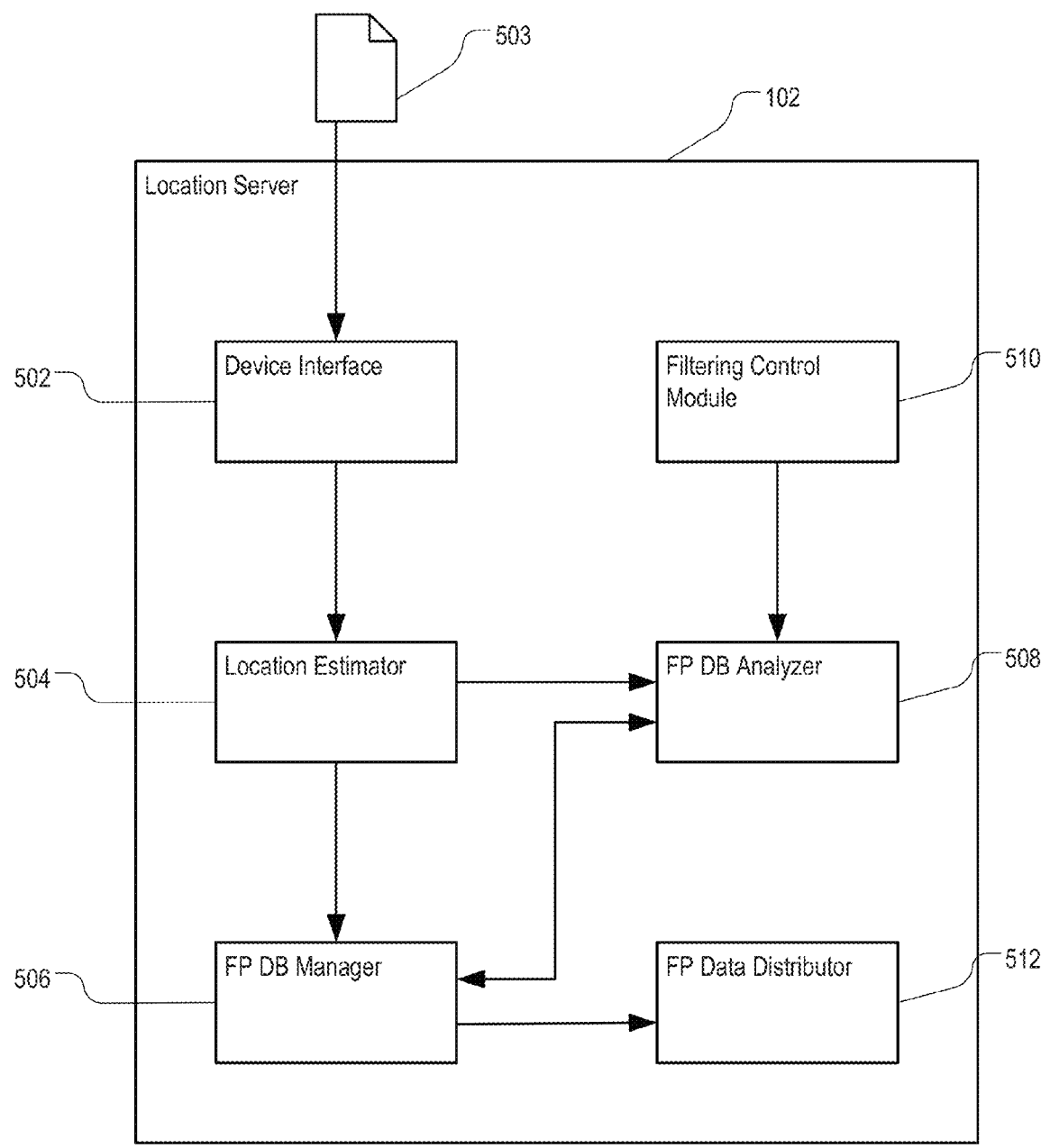
FIG. 5 is a block diagram illustrating exemplary components of a location server configured to monitor a location fingerprint database.

FIG. 5 is a block diagram illustrating exemplary components of location server 102 configured to monitor a location fingerprint database. Location server 102 can include one or more computers configured to monitor the location fingerprint database.

Location server 102 can include device interface 502. Device interface 502 is a component of location server 102 configured to request one or more mobile devices (e.g., mobile device 114 of FIG. 1) to submit monitor data 503 and to receive monitor data 503 from the mobile devices. Monitor data 503 can include a location of the mobile device, identifiers of signal sources detected at the location, and a measurement of a signal from each of the signal sources.

Device interface 502 can provide monitor data 503 to location estimator 504. Location estimator 504 is a component of location server 102 configured to determine a location of a signal source identified in monitor data 503. When information on the signal source is scarce, e.g., when only one mobile device has detected the signal source, location estimator 504 can designate the location of the mobile device as the location of the signal source, and associate that location with a high uncertainty. When information on the signal source is abundant, e.g., when a statistically significant number of mobile devices have detected the signal source, location estimator 504 can determine the location of the signal source using a probability density function. The location of the signal source can include one or more sets of latitude, longitude, and optionally, altitude coordinates, each set of coordinates being associated with an uncertainty value.

Location estimator 504 can provide identifiers of the signal sources to fingerprint database manager 506, and the locations of the signal sources to fingerprint database analyzer 508. Fingerprint database manager 506 is a component of location server 102 configured to interface with a location fingerprint database (e.g., location fingerprint database 104 of FIG. 1), including retrieving information from the location fingerprint database and updating information in the location fingerprint database. Upon receiving the identifiers, fingerprint database manager 506 can retrieve the stored locations associated with the identified signal sources, and provide the stored locations to fingerprint database analyzer 508.

Fingerprint database analyzer 508 is a component of location server 102 configured to receive estimated locations of signal sources from location estimator 504 and stored locations of the signal sources from location fingerprint database manager 506. In addition, fingerprint database analyzer 508 can be configured to determine if any one of the signal sources has moved by comparing the estimated locations and the stored locations. In performing the comparison, fingerprint database analyzer 508 can apply one or more threshold values, e.g., reaches for various types of signal sources. The threshold values can be provided to fingerprint database analyzer 508 as parameters of fingerprint database analysis. Fingerprint database analyzer 508 can receive the parameters from filtering control module 510.

Filtering control module 510 is a component of location server 102 configured to determine a condition upon which a signal source is removed or filtered out from a location fingerprint database. For example, filtering control module 510 can determine the thresholds for determining whether a signal source has moved, based on types of the signal sources or user configuration. The thresholds can be reaches of the signal sources. The thresholds may be different for different signal sources. For example, for a NFC device, the threshold can be a few meters; for a wireless access point, the threshold can be a few hundred meters; for a cellular tower, the threshold can be several kilometers. In some implementations, the threshold can be determined based on data received from sampling mobile devices (e.g., sampling device 302) or monitoring mobile devices (e.g., mobile device 114). For example, filtering control module 510 can determine that the threshold is a reach of a device, and the reach is a largest distance between an estimated location calculated for the signal source and the location of a mobile device that provided data for calculating the estimated location of the signal source.

Based on the parameters received from filtering control module 510, estimated location of signal sources from location estimator 504, and stored locations from fingerprint database manager 506, fingerprint database analyzer 508 can determine which signal source, if any, has moved. When fingerprint database analyzer 508 determines a signal source has moved, fingerprint database analyzer 508 can notify fingerprint database manager 506 by providing the identifier of the moved signal source. Fingerprint database manager 506 can update the location fingerprint database accordingly.

Location server can include fingerprint data distributor 512. Fingerprint data distributor 512 is a component of location server 102 configured to provide location fingerprint data stored in the location fingerprint database to a mobile device. A mobile device approaching or entering a venue can request location fingerprint data for the venue. Fingerprint data distributor 512 can receive the request, provide an identifier of the venue to fingerprint database manager 506, and receive the most recent location data associated with the venue from fingerprint database manager 506. Fingerprint data distributor 512 can provide the location data received from fingerprint database manager 506 to the requesting mobile device.

Exemplary Processes

Figure 6:
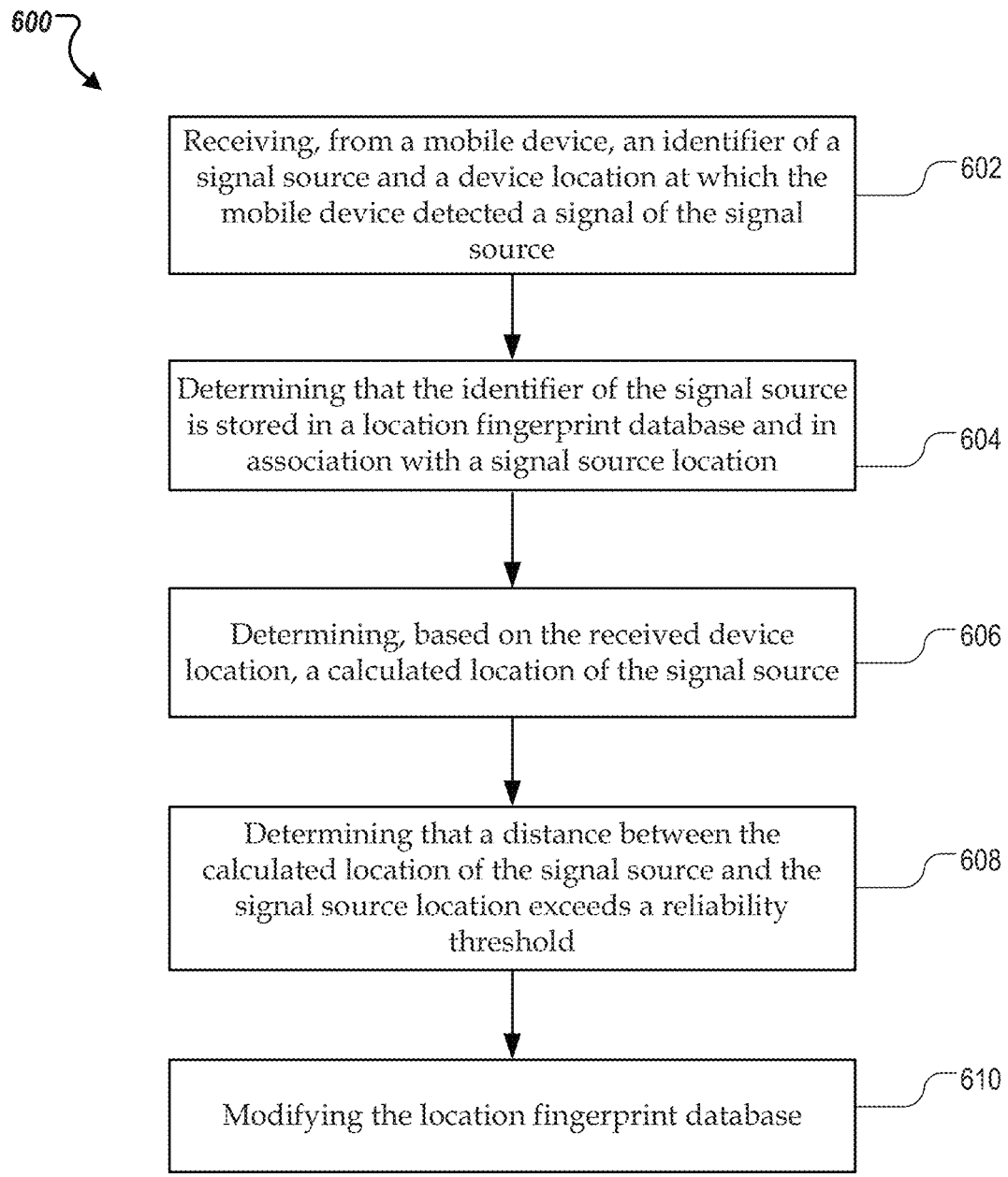
FIG. 6 is a flowchart of an exemplary procedure of monitoring a location fingerprint database.

FIG. 6 is a flowchart an exemplary procedure of monitoring a location fingerprint database. Procedure 600 can be performed by location server 102 of FIG. 1.

Location server 102 can receive (602), from a mobile device (e.g., mobile device 114 of FIG. 1), an identifier of a signal source (e.g., signal source SS3 of FIG. 1) and a device location. The device location can be a location at which the mobile device detected a signal of the signal source. The device location can be determined independently of the signal source. For example, the device locations can be determined by GPS signals. The signal source can be a device that transmits radio frequency (RF) signals. For example, the signal source can be a wireless access point.

Location server 102 can determine (604) that the identifier of the signal source is stored in a location fingerprint database (e.g., location fingerprint database 104 of FIG. 1) and in association with a signal source location. The signal source and the signal source location can be used for determining an estimated location of a pedestrian located at a venue. The venue can include a space accessible by the pedestrian and one or more constraints of movements of the pedestrian.

Location server 102 can determine (606), based on the received device location, a calculated location of the signal source. In some implementations, determining the calculated location can include designating the device location as the calculated location. In some implementations, determining the calculated location can include receiving a second device location from another mobile device, and determining the calculated location based on the received device locations using a probability density function.

Location server 102 can determine (608) that a distance between the calculated location of the signal source and the signal source location stored in the location fingerprint database exceeds a reliability threshold. The reliability threshold can correspond to a reach of the signal source. The reach of the signal source can be a detected or an estimated communication range of the signal source. For example, when the signal source is a wireless access point, the reliability threshold can be a maximum distance from which an RF signal from the wireless access point can be detected.

Upon determining that the distance exceeds the reliability threshold, Location server 102 can modify (610) the location fingerprint database. Modifying the location fingerprint database can include modifying an attribute of the location fingerprint database or modifying location data stored in the location fingerprint database.

Modifying the location data stored in the location fingerprint database comprises labeling the signal source, removing information on the signal source, or the adjusting a weight of the signal source in determining the estimated location of the pedestrian. Modifying the attribute of the location fingerprint database can include changing a procedure of using the signal source for determining the estimated location of the pedestrian. Changing the procedure can include preventing the signal source from being used for determining the estimated location of the pedestrian, or adjusting a weight of the signal source in determining the estimated location of the pedestrian.

In some implementations, location server 102 can determine that a distance between the signal source location and a second venue satisfies a fingerprint threshold distance. For example, location server 102 can determine that a distance between the signal source location and the second venue is sufficiently close such that the signal source and the signal source location can be used to determine an estimated location of a pedestrian located at the second venue. Location server 102 can provide to one or more sampling devices a request to conduct a fingerprint survey at the second venue. Conducting the fingerprint survey can include determining a measurement of a signal from the signal source detected by each sampling device at each of multiple locations at the second venue. Conducting the fingerprint survey can include submitting, by each sampling device and to location server 102, each measurement and each corresponding location. Location server 102 can then determine a location fingerprint of the second venue based on the measurements and corresponding locations received from the one or more sampling devices. The measurements can include at least one of an RSSI, a round-trip time, a magnetic field strength, a temperature, a sound level, or an air pressure level.

Exemplary System Architecture

Figure 7:
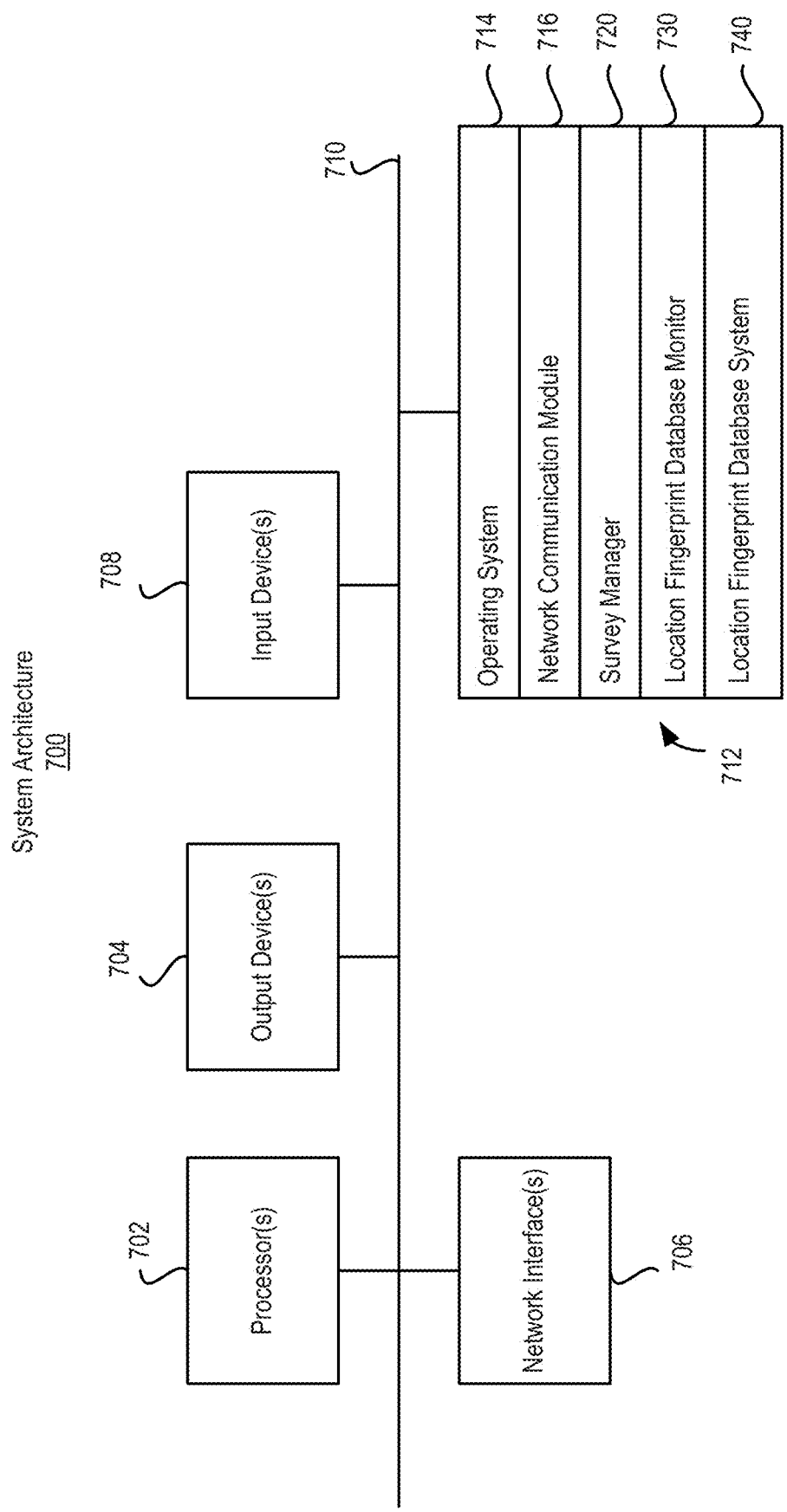
FIG. 7 is a block diagram of an exemplary system architecture for implementing the features and operations of FIGS. 1-6.

FIG. 7 is a block diagram of an exemplary system architecture for implementing the features and operations of FIGS. 1-6. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to a medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., a Linux® operating system), network communication module 716, survey manager 720, location fingerprint database monitor 730, and location fingerprint database system 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.).

Survey manager 720 can include computer instructions that, when executed, cause processor 702 to provide survey instructions to mobile devices for providing reference locations and detected signal sources to a location server, and receive survey data from the mobile devices. Location fingerprint database monitor 730 can include computer instructions that, when executed, cause processor 702 to perform operations of device interface 502, location estimator 504, fingerprint database manager 506, fingerprint database analyzer 508, filtering control module 510, and fingerprint data distributor 512. Location fingerprint database system 740 can include computer instructions that, when executed, cause processor 702 to perform database operations including inserting, modifying, selecting, and deleting data in the location fingerprint database.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Exemplary Mobile Device Architecture

Figure 8:
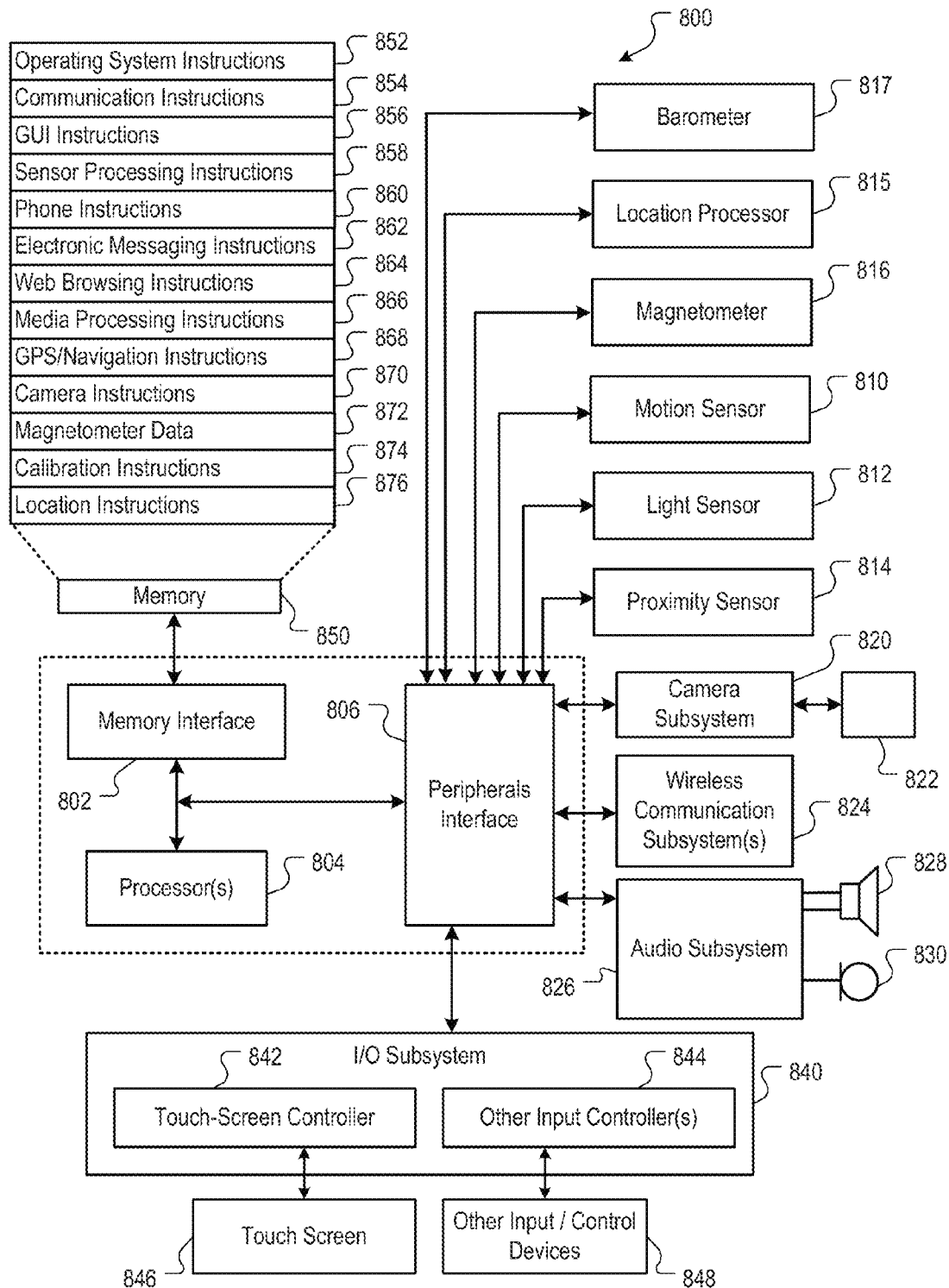
FIG. 8 is a block diagram illustrating an exemplary device architecture of a mobile device implementing the features and operations described in reference to FIGS. 1-6.

FIG. 8 is a block diagram of an exemplary architecture 800 for the mobile devices of FIGS. 1-6. A mobile device (e.g., mobile device 114) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in mobile device 114, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMax™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch screen controller 842 and/or other input controller(s) 844. Touch-screen controller 842 can be coupled to a touch screen 846 or pad. Touch screen 846 and touch screen controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 846.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch screen 846; and a pressing of the button for a second duration that is longer than the first duration may turn power to mobile device 114 on or off. The user may be able to customize a functionality of one or more of the buttons. The touch screen 846 can, for example, also be used to implement virtual or soft buttons and/or a keyboard.

In some implementations, mobile device 114 can present recorded audio and/or video files, such as MP3, AAC, and MPEG files. In some implementations, mobile device 114 can include the functionality of an MP3 player. Mobile device 114 may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can include location instructions 876 that can be used to provide a location determined using location processor 815 and a set of one or more identifiers of signal sources to a location server, and determine a location of the mobile device using location fingerprint data when location determination using location processor 815 is unavailable.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
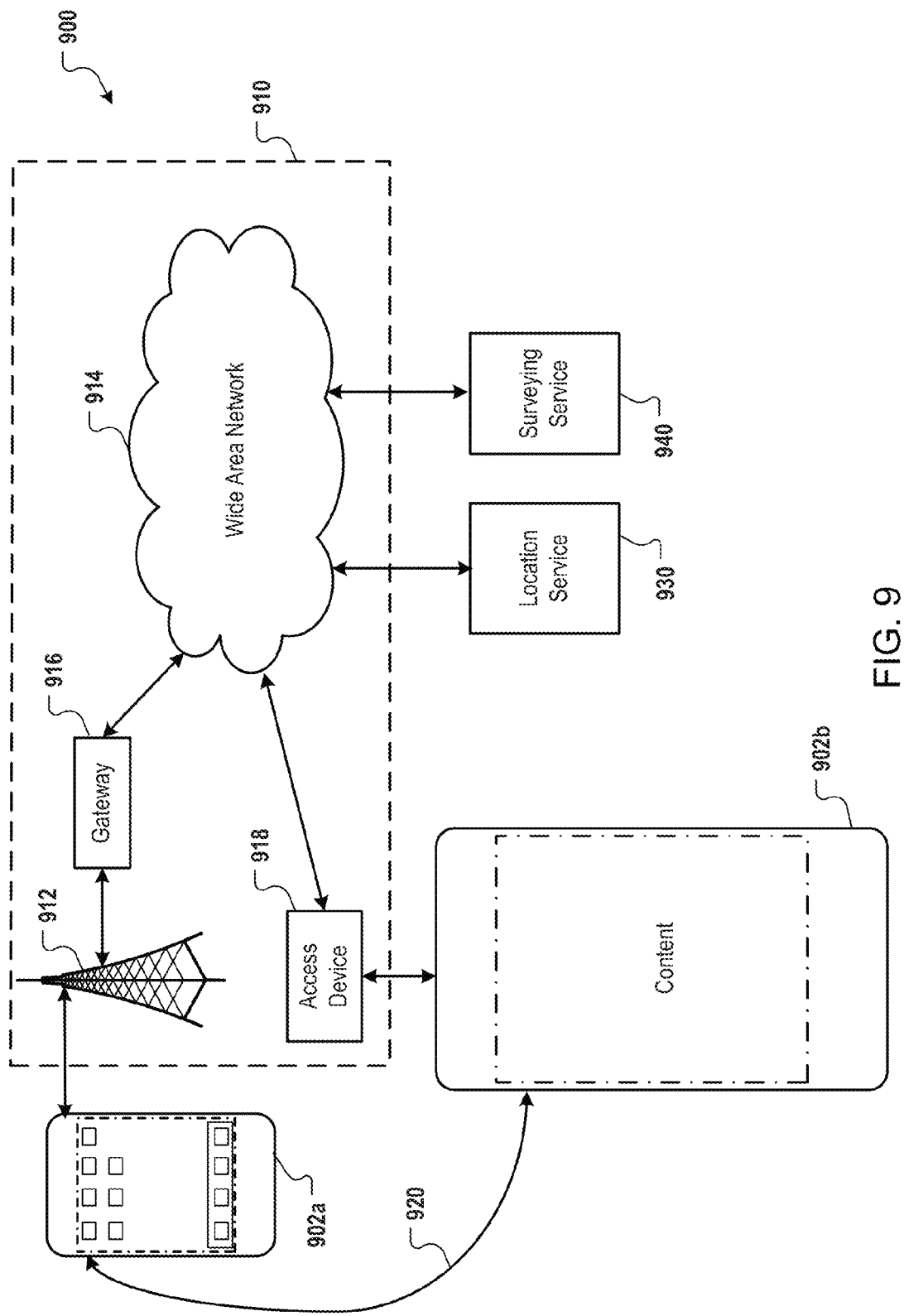
FIG. 9 is a block diagram of an exemplary network operating environment for the mobile devices of FIGS. 1-6.

FIG. 9 is a block diagram of an exemplary network operating environment 900 for the mobile devices of FIGS. 1-6. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

The mobile device 902a or 902b can, for example, communicate with one or more services 930 and 940 over the one or more wired and/or wireless networks. For example, one or more location services 930 can provide location fingerprint data to mobile devices 902a and 902b, provide updates of the location data, and provide algorithms for determining a location of mobile devices 902a and 902b. Surveying service 940 can provide instructions to mobile devices 902a and 902b to submit survey data to a location server, when users of mobile devices 902a and 902b choose to participate in the survey.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:

receiving, by a server and from a mobile device, an identifier of a signal source and a device location, the device location being a location at which the mobile device detected a signal of the signal source, the device location being determined independently of the signal source;

determining, by the server, that the identifier of the signal source is stored in a location fingerprint database and in association with a signal source location, the signal source and the signal source location usable for determining an estimated location of a pedestrian located at a venue, the venue comprising a space accessible by the pedestrian and one or more constraints of movements of the pedestrian;

determining, by the server and based on the received device location, a calculated location of the signal source;

determining, by the server, that a distance between the calculated location of the signal source and the signal source location stored in the location fingerprint database exceeds a reliability threshold;

upon determining that the distance exceeds the reliability threshold, modifying the location fingerprint database, including modifying the signal source location stored in the location fingerprint database;

determining, by the server, that a distance between the updated signal source location and a second venue satisfies a fingerprint threshold where the signal source is usable for determining an estimated location of a second pedestrian located at the second venue; and in response, submitting, by the server and to one or more sampling devices, a request for conducting a fingerprint survey at the second venue to generate one or more measurements of the second venue, the one or more measurements usable by the server to determine a location fingerprint of the second venue, wherein the server comprises one or more computers.

2. The method of claim 1, wherein the signal source comprises a wireless access point, where a signal of the signal source is detectable by the mobile device when the mobile device is located within a reach of the wireless access point, the reach comprising a detected or estimated communication range of the wireless access point.

3. The method of claim 2, wherein the reliability threshold corresponds to the reach of the wireless access point.

4. The method of claim 1, wherein determining the calculated location of the signal source comprises at least one of:

designating the device location as the calculated location, or receiving a second device location from another mobile device, and determining the calculated location based on the received device locations using a probability density function.

5. The method claim 1, wherein:

changing the procedure of using the signal source for determining the estimated location comprises preventing the signal source from being used for determining the estimated location of the pedestrian, and changing the data stored in the location fingerprint database comprises labeling the signal source, removing information on the signal source, or adjusting a weight of the signal source in determining the estimated location of the pedestrian.

6. The method of claim 1, wherein conducting the fingerprint survey comprises:

determining a measurement of a signal from the signal source detected by each sampling device at each of a plurality of locations at the second venue; and submitting, by the sampling device and to the server, each measurement and each corresponding location.

7. The method of claim 6, comprising, determining, by the server, the location fingerprint of the second venue based on the measurements and corresponding locations received from the one or more sampling devices, wherein the measurements comprise at least one of a received signal strength indication (RSSI), a round-trip time, a magnetic field strength, a temperature, a sound level, or an air pressure level.

8. A system comprising:

a server including one or more computer processors;

a non-transitory storage device storing instructions operable to cause the server to perform operations comprising:

receiving, from a mobile device, an identifier of a signal source and a device location, the device location being a location at which the mobile device detected a signal of the signal source, the device location being determined independently of the signal source;

determining that the identifier of the signal source is stored in a location fingerprint database and in association with a signal source location, the signal source and the signal source location usable for determining an estimated location of a pedestrian located at a venue, the venue comprising a space accessible by the pedestrian and one or more constraints of movements of the pedestrian;

determining, based on the received device location, a calculated location of the signal source;

determining that a distance between the calculated location of the signal source and the signal source location stored in the location fingerprint database exceeds a reliability threshold;

upon determining that the distance exceeds the reliability threshold, modifying the location fingerprint database, including modifying the signal source location stored in the location fingerprint database;

determining, by the server, that a distance between the updated signal source location and a second venue satisfies a fingerprint threshold where the signal source is usable for determining an estimated location of a second pedestrian located at the second venue; and in response, submitting, by the server and to one or more sampling devices, a request for conducting a fingerprint survey at the second venue to generate one or more measurements of the second venue, the one or more measurements usable by the server to determine a location fingerprint of the second venue.

9. The system of claim 8, wherein the signal source comprises a wireless access point, where a signal of the signal source is detectable by the mobile device when the mobile device is located within a reach of the wireless access point, the reach comprising a detected or estimated communication range of the wireless access point.

10. The system of claim 9, wherein the reliability threshold corresponds to the reach of the wireless access point.

11. The system of claim 8, wherein determining the calculated location of the signal source comprises at least one of:

designating the device location as the calculated location, or receiving a second device location from another mobile device, and determining the calculated location based on the received device locations using a probability density function.

12. The system claim 8, wherein:
changing the procedure of using the signal source for determining the estimated location comprises preventing the signal source from being used for determining the estimated location of the pedestrian, and
changing the data stored in the location fingerprint database comprises labeling the signal source, removing information on the signal source, or adjusting a weight of the signal source in determining the estimated location of the pedestrian.

13. The system of claim 8,
wherein conducting the fingerprint survey comprises:
determining a measurement of a signal from the signal source detected by each sampling device at each of a plurality of locations at the second venue; and
submitting, by the sampling device and to the server, each measurement and each corresponding location.

14. The system of claim 13, the operations comprising, determining, by the server, the location fingerprint of the second venue based on the measurements and corresponding locations received from the one or more sampling devices, wherein the measurements comprise at least one of a received signal strength indication (RSSI), a round-trip time, a magnetic field strength, a temperature, a sound level, or an air pressure level.

15. A non-transitory storage device storing computer instructions operable to cause one or more processors to perform operations comprising:
receiving, by a server and from a mobile device, an identifier of a signal source and a device location, the device location being a location at which the mobile device detected a signal of the signal source, the device location being determined independently of the signal source;
determining, by the server, that the identifier of the signal source is stored in a location fingerprint database and in association with a signal source location, the signal source and the signal source location usable for determining an estimated location of a pedestrian located at a venue, the venue comprising a space accessible by the pedestrian and one or more constraints of movements of the pedestrian;
determining, by the server and based on the received device location, a calculated location of the signal source;
determining, by the server, that a distance between the calculated location of the signal source and the signal source location stored in the location fingerprint database exceeds a reliability threshold;
upon determining that the distance exceeds the reliability threshold, modifying the location fingerprint database, including modifying the signal source location stored in the location fingerprint database;
determining, by the server, that a distance between the updated signal source location and a second venue satisfies a fingerprint threshold where the signal source is usable for determining an estimated location of a second pedestrian located at the second venue; and
in response, submitting, by the server and to one or more sampling devices, a request for conducting a fingerprint survey at the second venue to generate one or more measurements of the second venue, the one or more measurements usable by the server to determine a location fingerprint of the second venue.

16. The non-transitory storage device of claim 15, wherein the signal source comprises a wireless access point, where a signal of the signal source is detectable by the mobile device when the mobile device is located within a reach of the wireless access point, the reach comprising a detected or estimated communication range of the wireless access point.

17. The non-transitory storage device of claim 16, wherein the reliability threshold corresponds to the reach of the wireless access point.

18. The non-transitory storage device of claim 15, wherein determining the calculated location of the signal source comprises at least one of:
designating the device location as the calculated location, or
receiving a second device location from another mobile device, and determining the calculated location based on the received device locations using a probability density function.

19. The non-transitory storage device claim 15, wherein:
changing the procedure of using the signal source for determining the estimated location comprises preventing the signal source from being used for determining the estimated location of the pedestrian, and
changing the data stored in the location fingerprint database comprises labeling the signal source, removing information on the signal source, or adjusting a weight of the signal source in determining the estimated location of the pedestrian.

20. The non-transitory storage device of claim 15,
wherein conducting the fingerprint survey comprises:
determining a measurement of a signal from the signal source detected by each sampling device at each of a plurality of locations at the second venue; and
submitting, by the sampling device and to the server, each measurement and each corresponding location.

21. The non-transitory storage device of claim 20, comprising, determining, by the server, the location fingerprint of the second venue based on the measurements and corresponding locations received from the one or more sampling devices, wherein the measurements comprise at least one of a received signal strength indication (RSSI), a round-trip time, a magnetic field strength, a temperature, a sound level, or an air pressure level.

* * * * *